US005621555A

United States Patent [19]
Park

[11] Patent Number: 5,621,555
[45] Date of Patent: Apr. 15, 1997

[54] LIQUID CRYSTAL DISPLAY HAVING REDUNDANT PIXEL ELECTRODES AND THIN FILM TRANSISTORS AND A MANUFACTURING METHOD THEREOF

[75] Inventor: Jae D. Park, Seoul, Rep. of Korea

[73] Assignee: Goldstar Co., Ltd., Rep. of Korea

[21] Appl. No.: 365,892

[22] Filed: Dec. 29, 1994

[30] Foreign Application Priority Data

Dec. 31, 1993 [KR] Rep. of Korea ............... 32120/1993

[51] Int. Cl.⁶ .................. G02F 1/1333; G02F 1/1343
[52] U.S. Cl. ........................................ 349/54; 349/147
[58] Field of Search ........................................ 359/59, 87

[56] References Cited

U.S. PATENT DOCUMENTS

| | | | |
|---|---|---|---|
| 4,509,828 | 4/1985 | Clerc et al. | 359/54 |
| 5,042,918 | 8/1991 | Suzuki | 359/59 |
| 5,331,447 | 7/1994 | Someya et al. | 359/59 |
| 5,473,451 | 12/1995 | Kazurov et al. | 359/59 |
| 5,499,123 | 3/1996 | Mikoshiba | 359/87 |

FOREIGN PATENT DOCUMENTS 5-107556  4/1993  Japan ............... 359/87

Primary Examiner—William L. Sikes
Assistant Examiner—Charles Miller
Attorney, Agent, or Firm—Ostrolenk, Faber, Gerb & Soffen, LLP

[57] ABSTRACT

An improved liquid crystal display(LCD) and a manufacturing method thereof capable of advantageously reducing point defects caused due to the defects of the thin film transistor and of increasing an aperture ratio by providing an upper and lower structure of a pixel electrode, which includes a plurality of transparent conductive film used as a pixel electrode and being vertically formed; and at least one thin film transistor being electrically connected to each of transparent conductive films.

12 Claims, 8 Drawing Sheets

5,621,555

LIQUID CRYSTAL DISPLAY HAVING REDUNDANT PIXEL ELECTRODES AND THIN FILM TRANSISTORS AND A MANUFACTURING METHOD THEREOF

BACKGROUND OF THE INVENTION

1. Field of the Invention

The present invention relates to a liquid crystal display-(LCD) and a manufacturing method thereof, and more particularly to an improved liquid crystal display and a manufacturing method thereof capable of advantageously reducing point defects caused due to the defects of the thin film transistor and of increasing an aperture ratio by providing an upper and lower structures of a pixel electrode.

2. Description of the Conventional Art

Conventionally, a thin film transistor used in a conventional LCD is shown in FIGS. 1A to 1D. As shown therein, a gate electrode 2 is formed on a predetermined portion of a substrate 1. Here, the gate electrode 2 is formed by selectively etching a metal layer using a photomask. In addition, on the upper portion of the gate electrode 2 is deposited an insulating material for forming an insulating film 3, on which an amorphous silicon film 4 is deposited. Thereafter, as shown in FIG. 1B, on the amorphous silicon film 4 is deposited a dopant amorphous silicon film 5, in which impurity objects, i.e., Phosphor, are doped. In addition, the dopant amorphous silicon film 5 and the amorphous silicon film 4 are etched using the same mask. Thereafter, as shown in FIG. 1C, on a predetermined portion of the insulating film 3 is formed a first transparent conductive film 6 which is used as a pixel electrode. Thereafter, as shown in FIG. 1D, on the first transparent conductive film 6 is deposited a metal film and then the metal film is selectively etched, whereby source/drain electrodes 7 are formed thereon.

However, the conventional thin film transistor, as shown in FIG. 2, have drawbacks in switching operation when the wirings respectively to either the gate electrode 2 or the source/drain electrode 7 become cut.

Accordingly, in an attempt to resolve such problems, one method of using a plurality of transistors, as shown in FIG. 3, is developed. In this case, if at least one transistor has a defect, another transistor normally works, so that at least somewhat the defect might be compensated. However, in the above case, the aperture ratio of the display cannot be improved.

SUMMARY OF THE INVENTION

Accordingly, it is an object of the present invention to provide a liquid crystal display (LCD) and a manufacturing method thereof.

It is another object of the present invention to provide an improved liquid crystal display (LCD) and a manufacturing method thereof capable of advantageously reducing point defects caused due to the defects of the thin film transistor and of increasing an aperture ratio by providing an upper and lower structure of a pixel electrode.

To achieve the object, there is provided a liquid crystal display (LCD), which includes a plurality of transparent conductive films used as a pixel electrode and vertically formed; and at least one thin film transistor electrically connected to each of transparent conductive films.

To achieve another object, it includes a pair of transparent conductive films used as a pixel electrode and vertically formed; and a first thin film transistor and a second thin film transistors electrically connected to a pair of transparent conductive films.

To achieve still another object, there is provided a liquid crystal display (LCD) manufacturing method, which includes a first step which deposits a gate electrode on a predetermined portion of a substrate; a second step which deposits an insulating film on the upper surface of the gate electrode; a third step which deposits a first transparent conductive film on a predetermined portion of the gate insulating film; a fourth step which deposits an insulating film on the upper surface of the first transparent conductive film; a fifth step which deposits a second transparent conductive film on a predetermined portion of the insulating film; a sixth step which forms a contact hole for allowing a drain electrode of the first thin film transistor to be electrically connected to the first transparent conductive film; and a seventh step which electrically connects a drain electrode of the first thin film transistor to the first transparent conductive film and electrically connects a drain electrode of the second thin film transistor to the second transparent conductive film.

DETAILED DESCRIPTION OF THE INVENTION

Figure 1A:
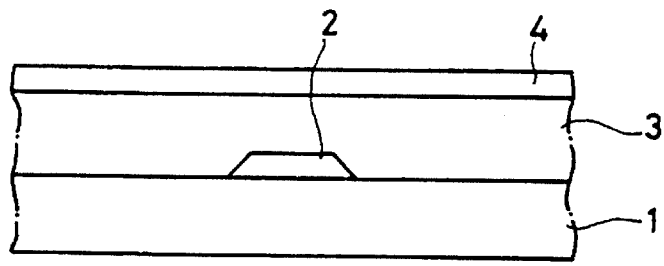
FIGS. 1A to 1D are cross-sectional views showing a conventional thin film transistor manufacturing method.
Figure 1B:
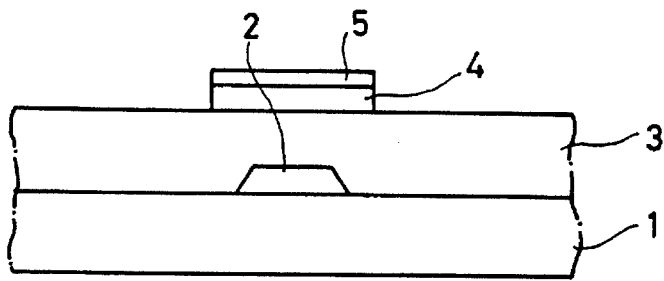
Figure 1C:
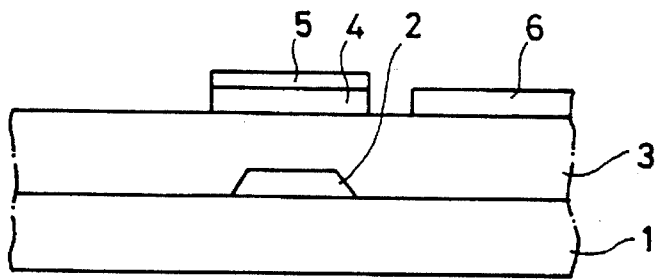
Figure 1D:
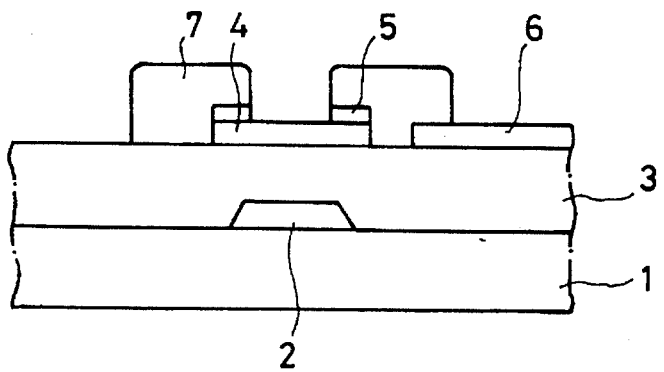
Figure 2:
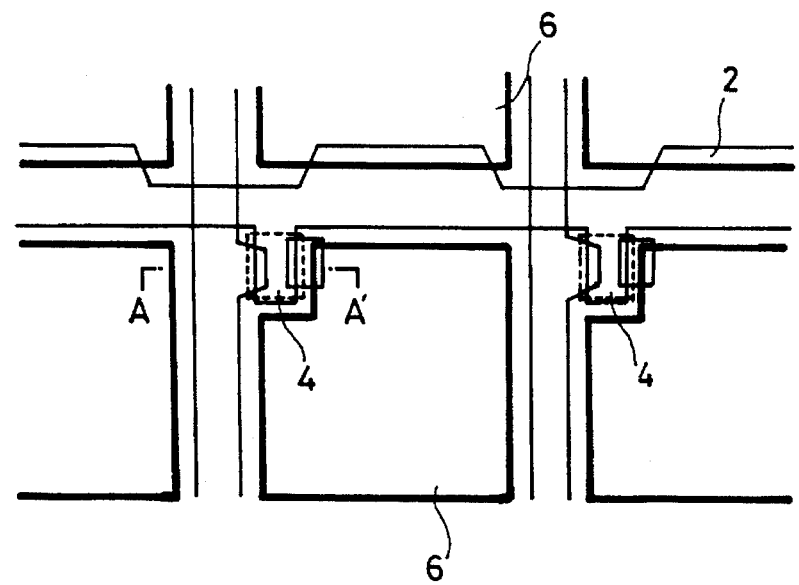
FIG. 2 is a top view showing a pixel structure of the LCD of the conventional thin film transistor manufacturing method.
Figure 3:
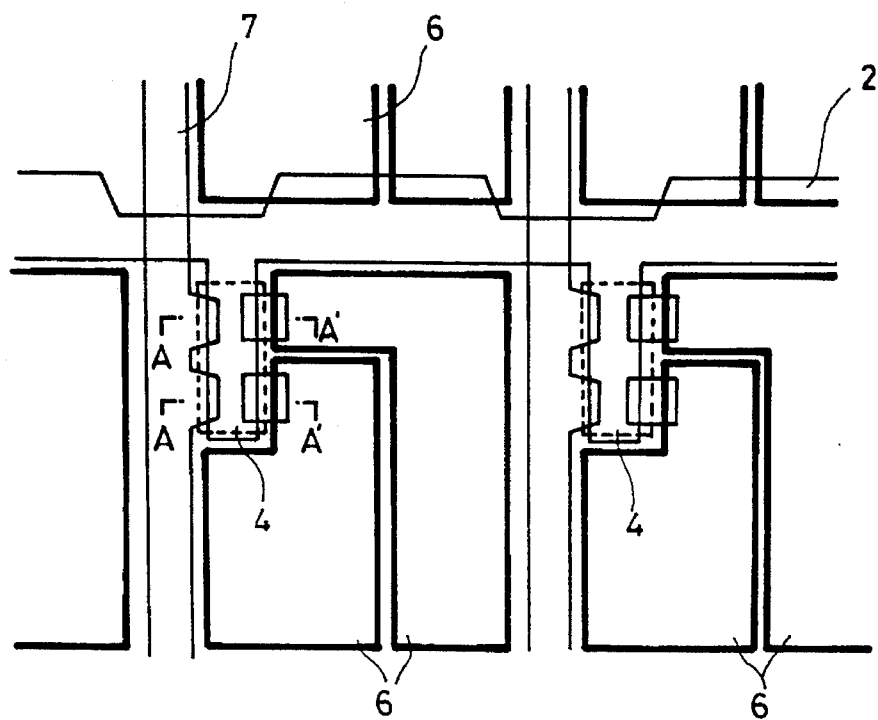
FIG. 3 is a top view showing a pixel structure of using a plurality the thin film transistors of the conventional type fabricated as shown in FIG. 1.
Figure 4A:
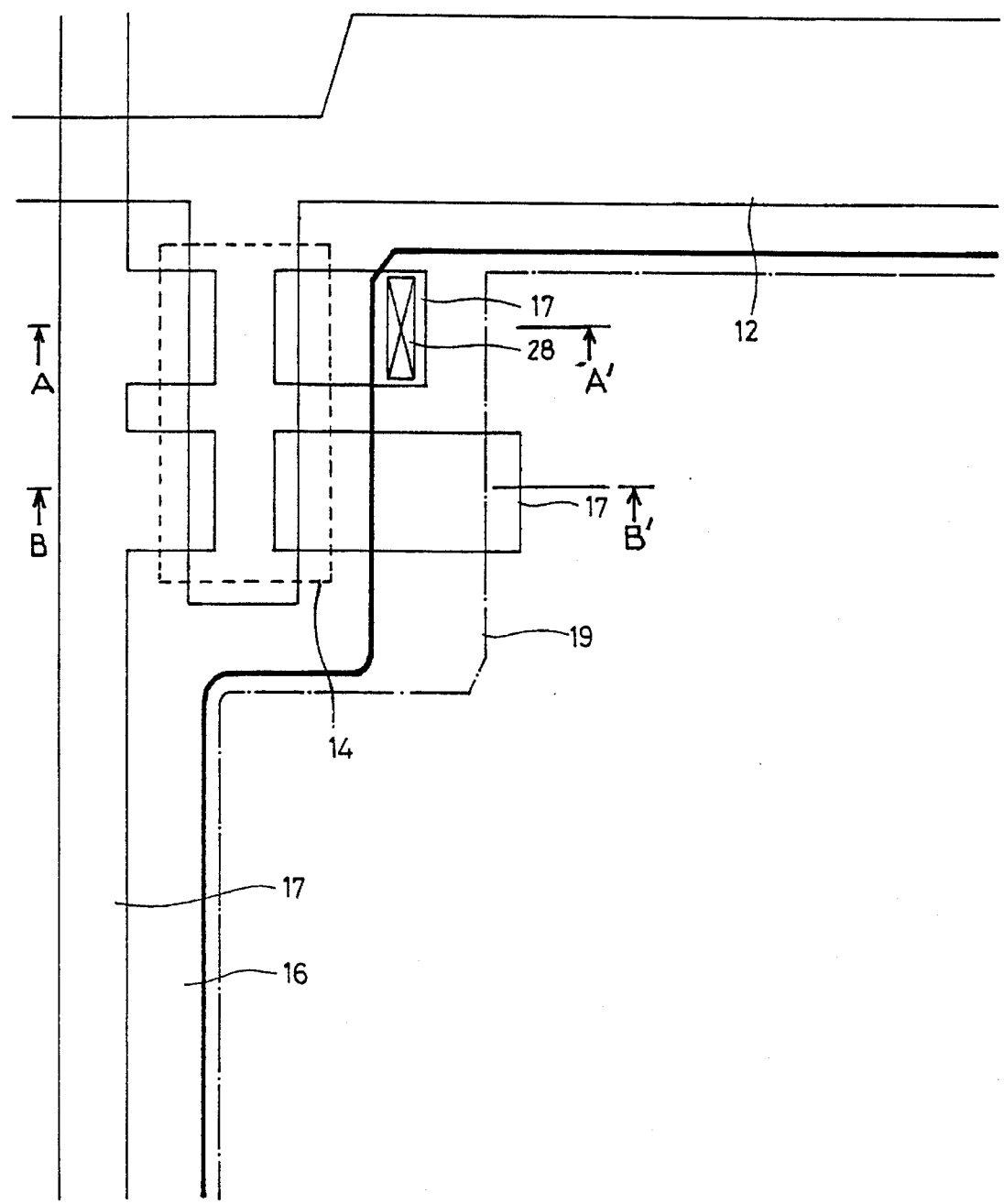
FIG. 4A is a top view showing a LCD having an upper and lower pixel structure of a first embodiment according to the present invention.

Referring to FIG. 4A, there is shown an LCD having an upper and lower pixel structure of a first embodiment according to the present invention. As shown therein, a first transparent conductive film 16 comprises of a pixel electrode therein. A second transparent conductive film 19 is connected to the first transparent conductive film 16 through a contact hole 28. In addition, there are provided first and second thin film transistors which perform a switching operation by applying a signal voltage to the first and second transparent conductive films.

Figure 4B:
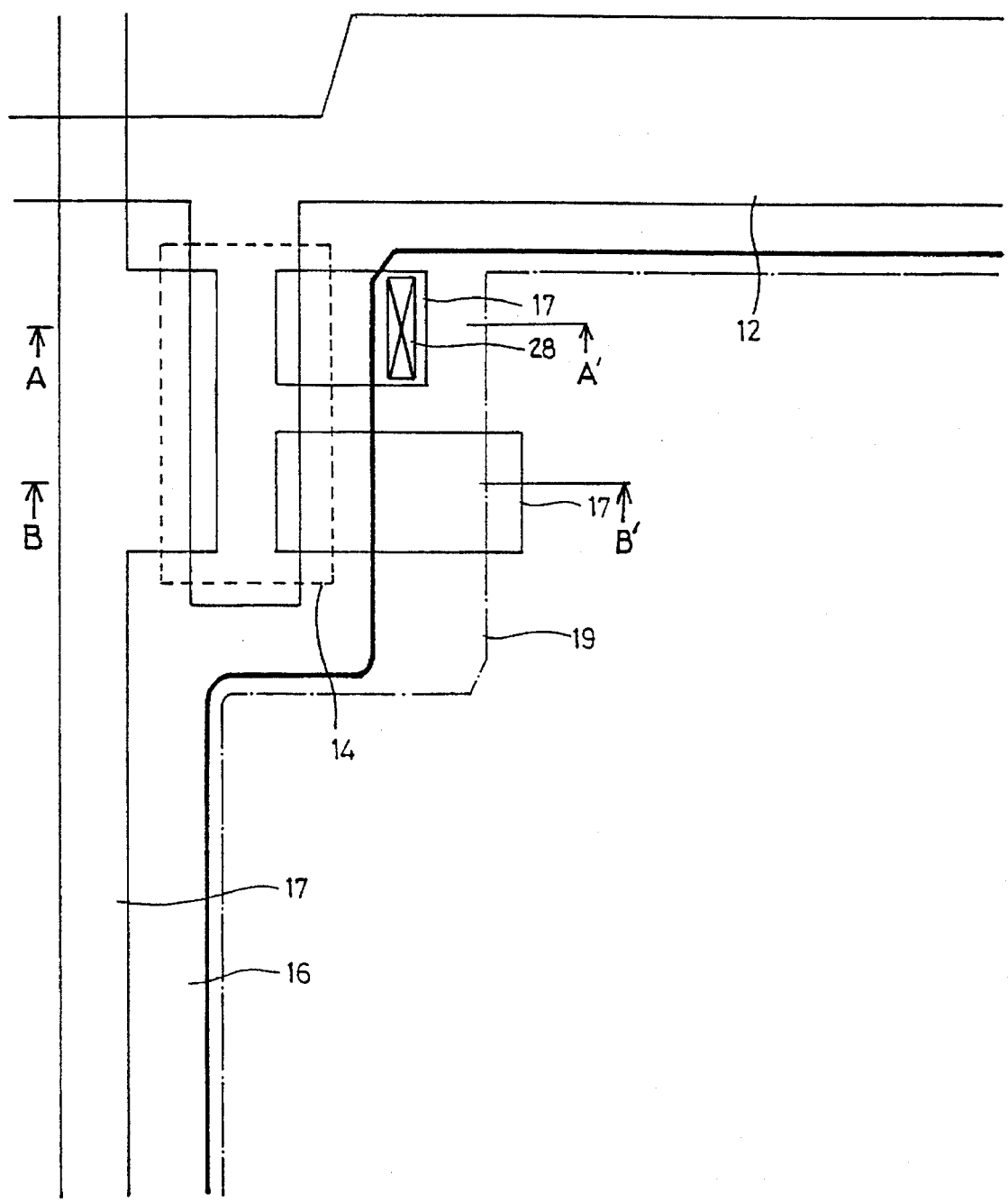
FIG. 4B is a top view showing a LCD having an upper and lower pixel structure of a second embodiment according to the present invention.

Referring to FIG. 4B, there is shown an LCD having an upper and lower pixel structure of a second embodiment according to the present invention. As shown therein, a source electrode of the first thin film transistor and a source electrode of the second thin film transistor are integrally formed. The remaining structure of the second embodiment according to the present invention is equal to the structure of the first embodiment according to the present invention.

Figure 4C:
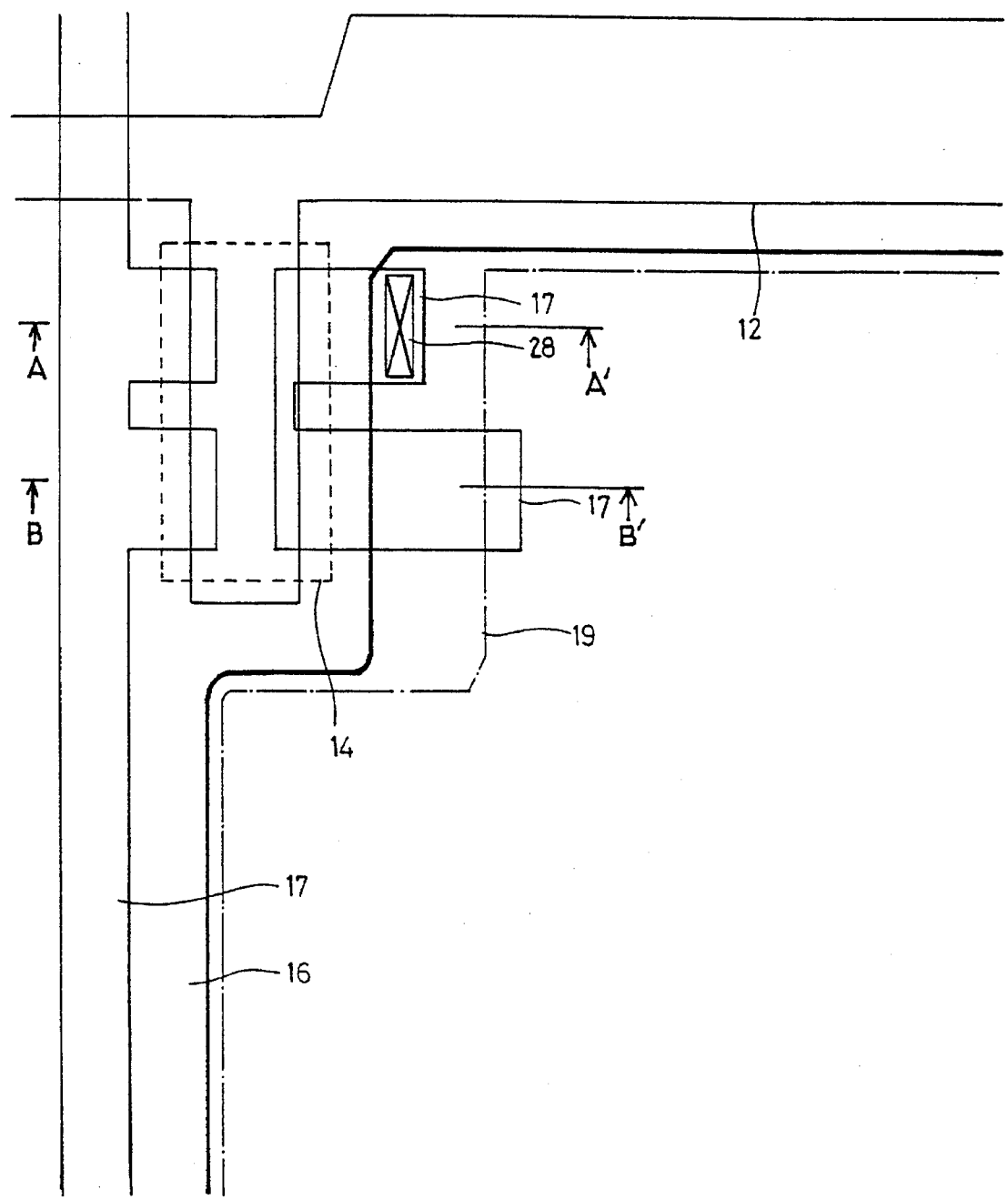
FIG. 4C is a top view showing a LCD having an upper and lower pixel structure of a third embodiment according to the present invention.

Referring to FIG. 4C, there is shown an LCD having an upper and lower pixel structure of a third embodiment according to the present invention. As shown therein, each of the drain electrodes of the thin film transistor which is connected to each of the pixel electrode is electrically connected with the other drain electrodes. The remaining structure of the third embodiment according to the present invention is equal to the structure of the first embodiment according to the present invention.

Figure 4D:
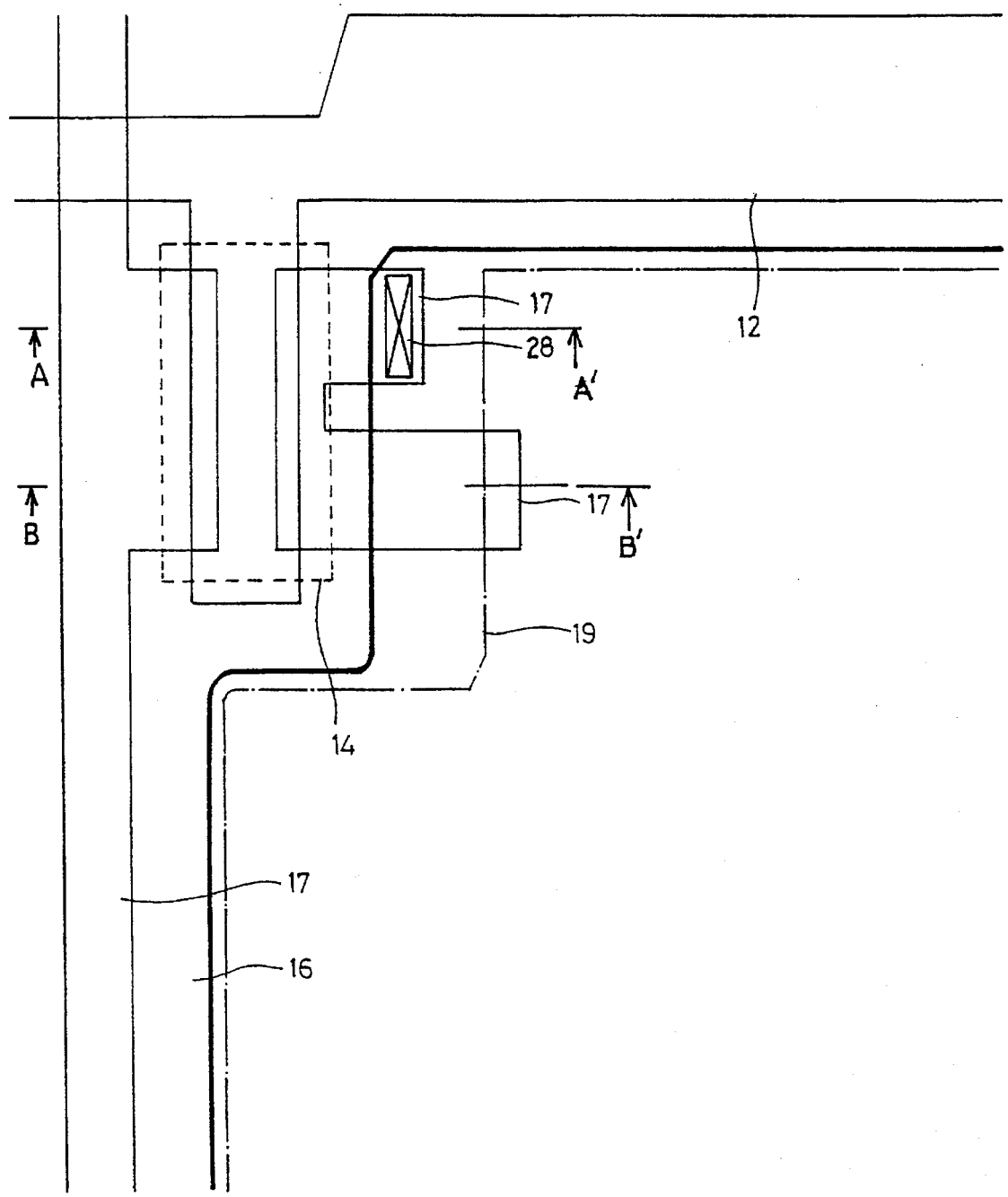
FIG. 4D is a top view showing a LCD having an upper and lower pixel structure of a fourth embodiment according to the present invention.

Referring to FIG. 4D, there is shown an LCD having an upper and lower pixel structure of a fourth embodiment according to the present invention. As shown therein, a source electrode of the first thin film transistor and a source electrode of the second thin transistor are integrally formed and each of drain electrodes of each thin film transistor which is connected to each of the pixel electrodes is electrically connected with each other. The remaining structure of the fourth embodiment according to the present invention is equal to the structure of the first embodiment according to the present invention.

Meanwhile, a first thin film transistor used in the LCD according to the present invention, as shown in FIGS. 5A–5D, is formed on a predetermined portion of the substrate 11.

Here, the gate electrode 12 is formed by selectively etching a metal layer using a photomask, which is formed after doping a photo-resist on the surface of the metal layer.

In addition, on the gate electrode 12 is formed an insulating material for forming a gate insulating film 13, and on a predetermined portion of the gate insulating film 13 is deposited a conductive material for forming a first transparent conductive film 16 which acts as a pixel electrode.

Figure 5A:
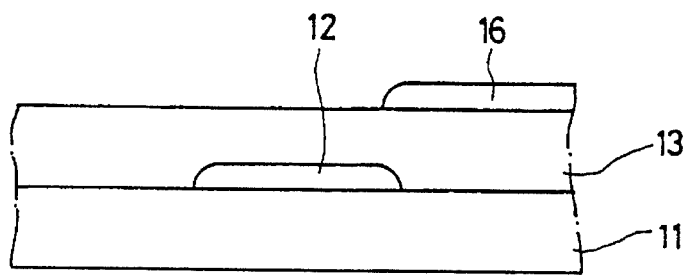
FIGS. 5A–5D show a cross-sectional view showing a first thin film transistor manufacturing method according to the present invention.
Figure 5B:
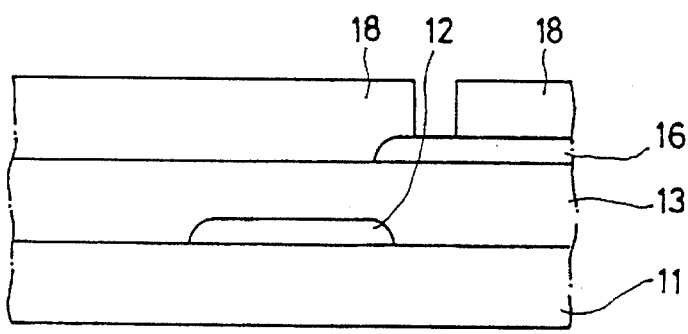

Thereafter, as shown in FIG. 5B, after an insulating film 18 having a predetermined thickness is deposited on the surface of the first transparent conductive film 16, the insulating film 18 is formed by selectively etching same to expose the first transparent conductive film 16 through a contact hole.

Figure 5C:
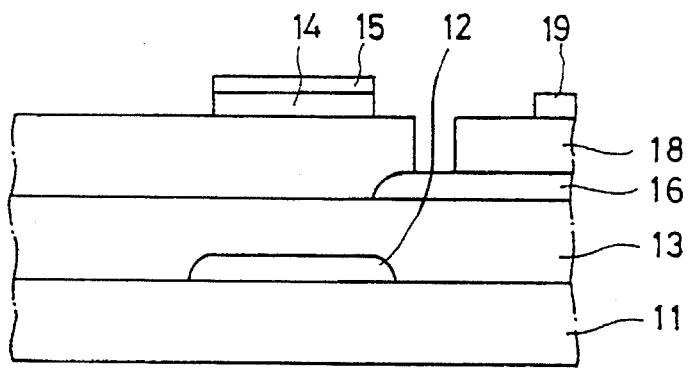

Thereafter, as shown in FIG. 5C, an amorphous silicon film 14 and a dopant amorphous silicon film 15 are deposited on the surface of the insulating film 18 and then the dopant amorphous silicon film 15 and the amorphous silicon film 14 are etched, respectively.

Thereafter, on the insulating film 18 is formed a second transparent conductive film 19 by depositing a transparent conductive material thereon.

Figure 5D:
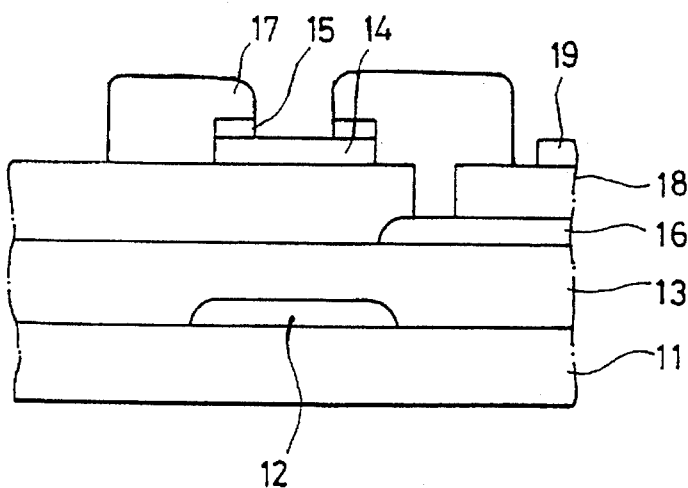
Figure 6A:
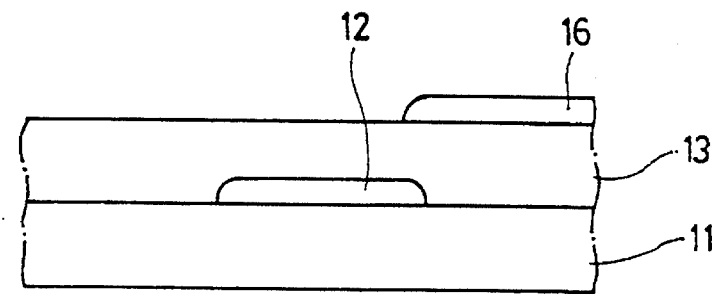
FIGS. 6A–6D show is a cross-sectional view showing a second thin film transistor manufacturing method according to the present invention.
Figure 6B:
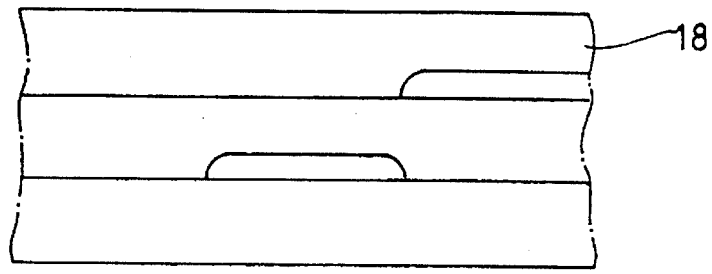
Figure 6C:
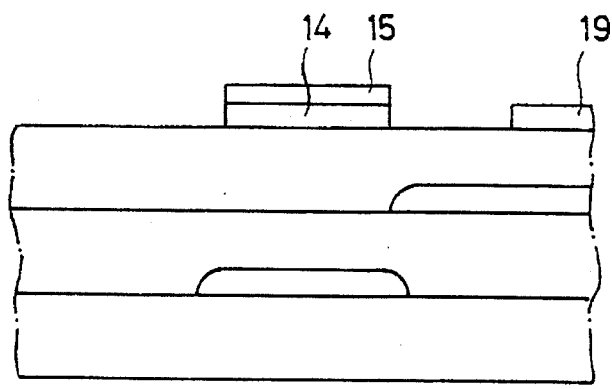
Figure 6D:
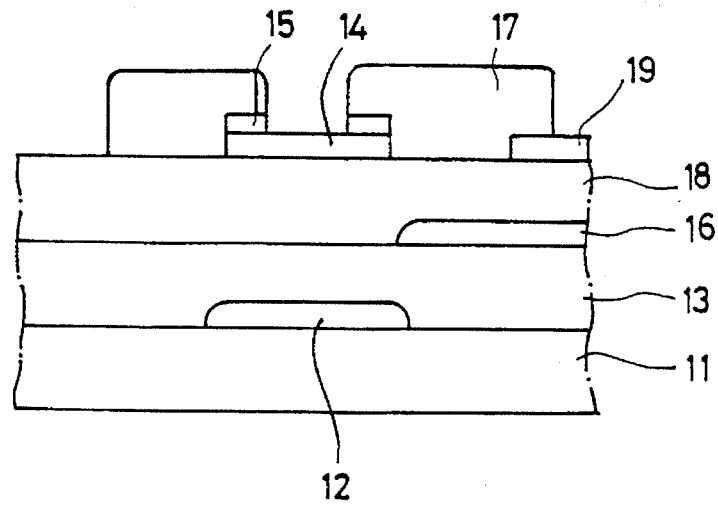

Thereafter, as shown in FIG. 5D, on the insulating film 18 is deposited a metal material and then a drain electrode 17 which is connected to the first transparent conductive film 16 via the contact hole is formed by etching the metal material.

Meanwhile, a manufacturing method of the second thin film transistor, as shown in FIGS. 6A to 6D, is similar to the method of the first thin film transistor, however, when the insulating film 18 is formed by depositing the insulating material on the surface of the first transparent film 16, the drain electrode 17 of the second thin film transistor is connected to the second transparent film 19, not etching the insulating film 18.

The LCD according to the present invention allows the use of an auxiliary pixel to reduce point defects even when flaws occur in the thin film transistors (TFTs), by controlling the amount of light through rearrangement of the liquid crystal elements in accordance to the voltage difference with the substrate voltage by maintaining a constant voltage of the pixel by means of the gate switching operation.

That is, in the case that any detects occur in the first thin film transistor and then the first thin film transistor cannot perform its specific role, the signal voltage flows to the second transparent conductive film by the second thin film transistor. On the contrary, in the case that any defects occur in the second thin film transistor and then the second thin film transistor cannot perform its specific role, the signal voltage flows to the first transparent conductive film by the first thin film transistor, so that a normal display operation can be obtained.

The LCD according to the present invention is directed to form the thin film transistor having the transparent conductive film which are used as the pixel electrode to be an upper and lower structure, so that even though at least one thin film transistor cannot work due to the defect therein, the signal voltage can flow to the first transparent conductive film or the second transparent conductive film by another thin film transistor, so that the point defect and the aperture ratio of the display can be reduced and increased.

What is claimed is:

1. A liquid crystal display device, comprising:

a pair of transparent conductive films used as a pixel electrode and vertically formed; and a first thin film transistor and a second thin film transistor electrically connected to respective one of said pair of transparent conductive films;

wherein said first thin film transistor is non-vertically electrically connected to its respective transparent conductive film and said second thin film transistor is vertically connected to its respective transparent conductive film through a contact hole.

2. The liquid crystal display of claim 1, wherein drain electrodes of the first thin film transistor and the second thin film transistor are electrically connected with each other.

3. A manufacturing method for a liquid crystal display, comprising the steps of:

a first step comprising depositing a gate electrode on a predetermined portion of a substrate;

a second step comprising depositing an insulating film on the upper surface of the gate electrode;

a third step comprising depositing a first transparent conductive film on a predetermined portion of the gate insulating film;

a fourth step comprising depositing an insulating film on the upper surface of the first transparent conductive film;

a fifth step comprising depositing a second transparency conductive film on a predetermined portion of the insulating film;

a sixth step comprising forming a contact hole for allowing a drain electrode of a first thin film transistor to be electrically connected to the first transparent conductive film; and a seventh step comprising electrically connecting a drain electrode of the first thin film transistor to the first transparency conductive film and electrically connecting a drain electrode of a second thin film transistor to the second transparent conductive film.

4. The method of claim 3, including electrically connecting said drain electrodes of each thin film transistor to each other.

5. A liquid crystal display device having a two transistor structure, comprising:

a substrate;

a gate electrode formed on said substrate;

a first insulating layer formed on said gate electrode and said substrate;

a first transparent electrode formed on a portion of said first insulating layer;

a second insulating layer formed on said first insulating layer and said first transparent electrode;

a contact hole formed in said second insulating layer so as to expose a portion of said first transparent electrode;

a semiconductor layer formed on a portion of said second insulating layer;

a doped semiconductor layer formed on side portions of said semiconductor layer so as to expose a portion of said semiconductor layer therebetween;

a second transparent electrode formed on a portion of said second insulating layer;

a first transistor having a first source electrode and a first drain electrode formed on said doped semiconductor layer and said second insulating layer, said first drain electrode being electrically connected to said first transparent electrode through said contact hole; and a second transistor having a second source electrode and a second drain electrode formed on said doped semiconductor layer and said second insulating layer, said second drain electrode being electrically connected to said second transparent electrode.

6. The liquid crystal display device of claim 5, wherein said first source electrode of said first transistor and said second source electrode of said second transistor are integrally formed.

7. The liquid crystal display device of claim 5, wherein said first and second drain electrodes are electrically connected with each other.

8. The liquid crystal display device of claim 7, wherein said first source electrode of said first transistor and said second source electrode of said second transistor are integrally formed.

9. A manufacturing method for a liquid crystal display device having a two transistor structure, comprising:

forming a gate electrode on a substrate;

forming a first insulating layer on said gate electrode and said substrate;

forming a first transparent electrode on a portion of said first insulating layer;

forming a second insulating layer on said first insulating layer and said first transparent electrode;

forming a contact hole at a portion of said second insulating layer so as to expose a portion of said first transparent electrode;

forming a semiconductor layer on a portion of said second insulating layer;

forming a dopant semiconductor layer on said semiconductor layer and removing a region of the same so as to expose a portion of said semiconductor layer;

forming a second transparent electrode on a portion of said second insulating layer; and forming first and second source electrodes and first and second drain electrodes on said doped semiconductor layer and said second insulating layer, said first drain electrode being electrically connected to said first transparent electrode through said contract hole and said second drain electrode being electrically connected to said second transparent electrode.

10. The method of claim 9, wherein said first source electrode of said first transistor and said second source electrode of said second transistor are integrally formed.

11. The method of claim 9, wherein said first and second drain electrodes are electrically connected with each other.

12. The method of claim 11, wherein said first source electrode of said first transistor and said second source electrode of said second transistor are integrally formed.

* * * * *